Oct. 30, 1928.
C. MACMILLAN
1,689,493
POWER SYSTEM
Filed June 3, 1925
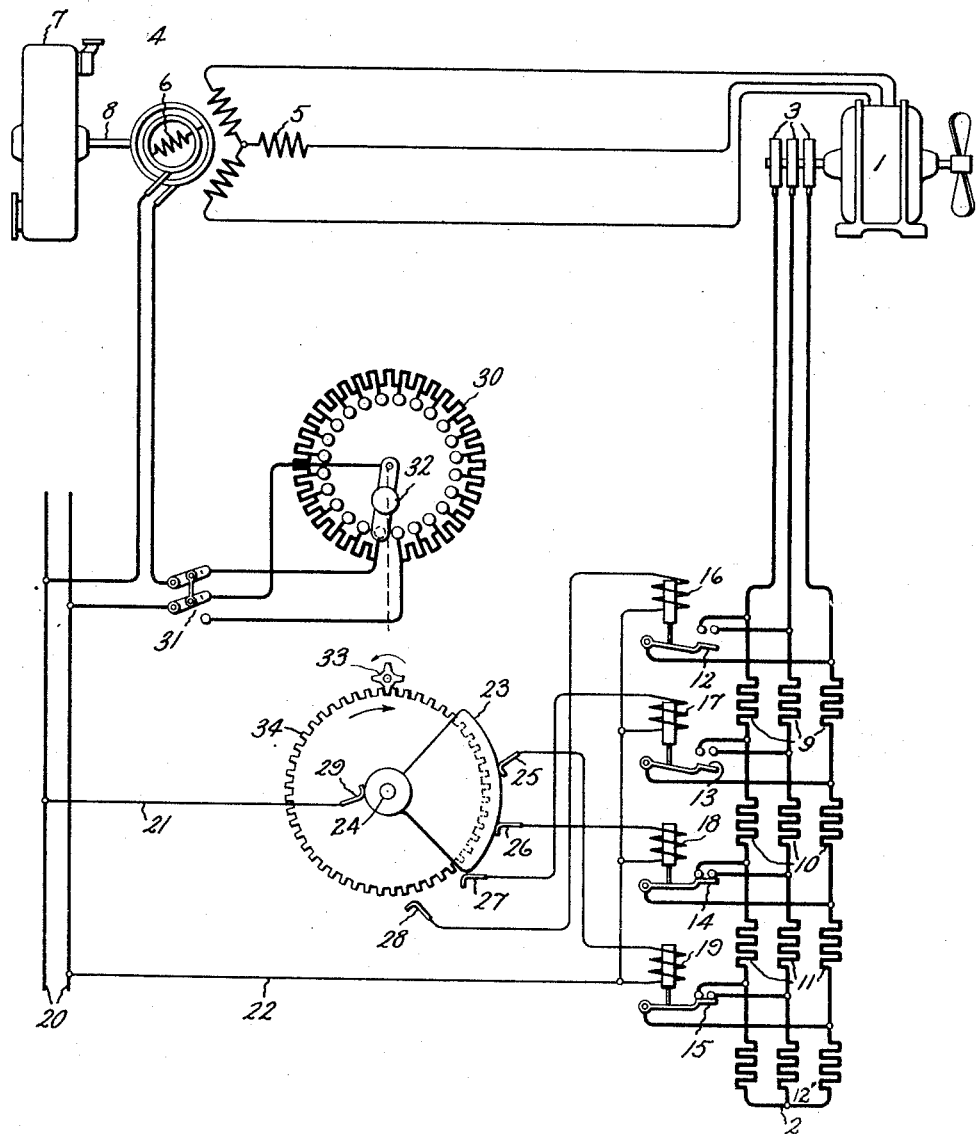
Inventor:
Campbell Macmillan,
by
His Attorney.

Patented Oct. 30, 1928.

1,689,493

UNITED STATES PATENT OFFICE.

CAMPBELL MACMILLAN, OF SCHENECTADY, NEW YORK, ASSIGNOR TO GENERAL ELECTRIC COMPANY, A CORPORATION OF NEW YORK.

POWER SYSTEM.

Application filed June 3, 1925. Serial No. 34,684.

My invention relates to electric power systems comprising an alternating current generator interconnected with an induction motor, and has for its principal object the provision of an improved means for correlating adjustment of the generator excitation and motor secondary resistance in a manner to control the motor speed without producing objectionable fluctuations in the electrical conditions of the system. In order to facilitate an understanding of my invention, it will be described as applied to a system of electric ship propulsion.

It is known that the torque required to drive a ship is a function of the speed at which the ship is driven; that the speed of the ship is determined by the speed of the propeller and propeller motor; that the motor speed and secondary voltage determine the effective impedance of the motor; and that, for any given speed and field excitation of the generator, the effective impedance of the motor determines the power output of the generator. Under these conditions, a change in the speed of the ship requires that a new state of stable equilibrium be established among several different variables, one or more of which may be adjusted or varied. The greatest degree of flexibility in the maneuvering of the ship is of course secured when there are no restrictions on the permissible variations in the generator speed, excitation, terminal voltage and load current. In actual installations, however, it is frequently desirable to restrict the range of variation in generator speed or voltage. Since the required generator speed and voltage are dependent on the generator excitation and motor secondary voltage and these factors may be adjusted through a considerable range, it is possible to secure either a series of definite speeds without great variation in voltage or a very gradual variation in speed with greater variation in voltage.

In order to secure a series of definite speeds without great variation in voltage, the generator field excitation should be suddenly increased at about the same time that the secondary voltage is changed by short circuiting a section of the secondary resistor and should be gradually decreased as the motor accelerates. In this way fluctuations in torque and current are exaggerated, the voltage is maintained approximately constant, and the steady motor speeds for any given speed of the generator are limited by the number of sections in the secondary resistor. In order to secure smooth speed control, the generator excitation should be suddenly decreased at about the same time that a section of the secondary resistor is short circuited and should be gradually increased as the motor accelerates, thus producing considerable variations in voltage but securing gradual changes in the torque and speed. The maintenance of approximately constant voltage during the transition between conditions of stable equilibrium is facilitated by the slow rate of change in the generator field flux. To secure a gradual variation in speed, however, requires abrupt changes in the generator field flux during this transition. It is therefore advantageous to produce the changes in field current and secondary resistance successively rather than at the same time, due consideration being given to the time constants of the generator field and armature windings. In accordance with my invention, these results are produced by the combination of means for properly correlating the operation of field and secondary resistors and means for reversing the connection of the generator field circuit to the field rheostat.

My invention will be better understood from the following description when considered in connection with the accompanying drawing and its scope will be pointed out in the appended claims.

The drawing shows an electric ship propulsion system wherein my invention has been embodied.

This system comprises a propeller motor 1 arranged to have its secondary circuit connected to an adjustable resistor 2 through slip rings 3 and to be supplied with current from an alternating current generator 4 which comprises armature and field windings 5 and 6 and is coupled through a shaft 8 to a prime mover shown as a steam turbine 7. The secondary resistor 2 comprises a plurality of sections 9, 10, 11 and 12' arranged to have their connections controlled by switches 12, 13, 14 and 15 respectively, the operation of these switches being effected by means of operating coils 16, 17, 18 and 19 which are adapted to be connected to a source of control current through leads 20, 21 and 22 and circuit control means comprising a contact member 23 mounted on shaft 24 and arranged to cooperate with contacts 25 to 29 inclusive. The field circuit 6 of the generator 4 is connected to the leads 20 through an adjustable resistor 30 and a reversing switch 31 which is provided for reversing the connections between the generator field circuit and rheostat. The operating arm 32 of the rheostat 30 is coupled to a gear 33 which cooperates with a gear 34 mounted on the shaft 24 and is arranged to rotate with the contact segment 23, the ratio of the gears 33 and 34 being such that the arm 32 makes one revolution while the edge of the contact member 23 moves from one contact to another, as from contact 26 to contact 27, for example.

Assuming the generator 4 to be operating and the switch 31 to be in its illustrated position, it will be readily understood that rotation of the rheostat control arm 32 in a counterclockwise direction onto the next contact will insert all of the resistor 30 in the generator field circuit in a manner suddenly to reduce the generator field excitation; that further rotation of the control arm 32 will bring the contact member 23 into engagement with the contact 27 thus causing section 10 of the secondary resistor 2 to be short circuited; and that still further rotation of the control arm 32 will reduce the part of the resistor 30 connected in the generator field circuit thus gradually increasing the generator 4 excitation as the motor 1 accelerates due to short circuiting of the section 10. In this manner a gradual acceleration of the motor 1 is produced and the ship may be readily maneuvered without danger of collision with other vessels or objects.

If it is desired to prevent large fluctuations in voltage as the speed of the ship is increased, the switch 31 is moved to its lower position. Under these conditions, movement of the control arm 32 in a counterclockwise direction onto the next contact will produce a sudden increase in generator excitation, further rotation of the arm 32 in the same direction will cause section 10 of the secondary resistor 2 to be short circuited, and still further rotation of the arm 32 will gradually decrease the generator excitation as the motor 1 accelerates due to short circuiting of the section 10. Short circuiting of the other sections of the resistor will be accomplished in the same manner.

It will be observed that the motor may be accelerated either gradually, but at the expense of considerable fluctuations in voltage, or through a series of definite speeds without great variation in voltage. In either case objectionable fluctuations in the electrical conditions of the system due to secondary switching are eliminated by anticipating them through suitable readjustments in the manner just described. The choice between these two methods of operation will of course depend largely on the conditions under which the ship is being operated.

The embodiment of the invention illustrated and described herein has been selected for the purpose of clearly setting forth the principles involved. It will be apparent, however, that the invention is susceptible of being modified to meet the different conditions encountered in its use and I therefore aim to cover by the appended claims all modifications within the true spirit and scope of my invention.

What I claim as new and desire to secure by Letters Patent of the United States, is—

1. The combination of an induction motor comprising primary and secondary circuits, an alternating current generator comprising a field circuit and an armature circuit interconnected with said primary circuit, means for controlling the resistance of said secondary circuit, means for controlling the excitation of said field circuit, and means independent of the electrical characteristics of said generator and said motor for correlating the operation of said resistance and excitation control means in a manner to cause an abrupt change to be produced in the excitation of said field circuit prior to a change in the resistance of said secondary circuit.

2. The combination of an induction motor comprising primary and secondary circuits, an alternating current generator comprising a field circuit and an armature circuit interconnected with said primary circuit, means comprising a plurality of resistance sections arranged to be successively short circuited for controlling the resistance of said secondary circuit, means for controlling the excitation of said field circuit, and means independent of the electrical characteristics of said generator and said motor for correlating the operation of said secondary resistance and field excitation control means in a manner to cause a definite change to be produced in the excitation of said field circuit prior to the short circuiting of each of said sections.

3. The combination of an induction motor comprising primary and secondary circuits, an alternating current generator comprising a field circuit and an armature circuit interconnected with said primary circuit, means comprising a plurality of resistance sections arranged to have their connections successively changed for controlling the resistance of said secondary circuit, means for controlling the excitation of said field circuit, and means independent of the electrical characteristics of said generator and said motor for correlating the operation of said secondary resistance and field excitation control means in a manner to cause a definite change in the excitation of said field circuit to be produced prior to a change in the connection of each of said sections.

4. The method of operating a power system comprising an alternating current generator interconnected with an induction motor which comprises abruptly changing the excitation of said generator, abruptly changing the secondary resistance of said motor, and gradually changing the excitation of said generator as the speed of said motor changes due to said change in secondary resistance.

5. The method of operating a power system comprising an alternating current generator interconnected with an induction motor which comprises abruptly decreasing the excitation of said generator, abruptly decreasing the secondary resistance of said motor, and gradually increasing the excitation of said generator as said motor accelerates due to said decrease in secondary resistance.

6. The method of operating a power system comprising an alternating current generator interconnected with an induction motor which comprises abruptly increasing the excitation of said generator, abruptly decreasing the secondary resistance of said motor, and gradually decreasing the excitation of said generator as said motor accelerates due to said decrease in secondary resistance.

7. The method of operating a power system comprising an alternating current generator interconnected with an induction motor which comprises abruptly changing the excitation of said generator, abruptly changing the secondary voltage of said motor, and gradually changing the excitation of said generator as the speed of said motor changes due to said change in secondary voltage.

8. The combination of an induction motor comprising primary and secondary circuits, an alternating current generator comprising a field circuit and an armature circuit interconnected with said primary circuit, means for controlling the voltage of said secondary circuit, means independent of the electrical characteristics of said generator and said motor for controlling the excitation of said field circuit, and means for correlating the operation of said voltage and excitation control means in a manner to cause an abrupt change to be produced in the excitation of said field circuit prior to changing the voltage of said secondary circuit.

9. The combination of an induction motor comprising primary and secondary circuits, an alternating current generator comprising a field circuit and an armature circuit interconnected with said primary circuit, means for controlling the voltage of said secondary circuit, means for controlling the excitation of said field circuit, and means for correlating the operation of said voltage and said excitation control means in a manner to cause an abrupt change to be produced in the excitation of said field circuit prior to changing the voltage of said secondary circuit followed by a gradual change in the excitation of said generator to its initial condition before further increasing or decreasing the voltage of said secondary circuit.

10. The method of operating a power system comprising an alternating current generator interconnected with an induction motor which comprises abruptly changing the secondary voltage of said motor and abruptly changing the excitation of said generator a sufficient interval of time prior to said change in secondary voltage to eliminate objectionable fluctuations in the electrical conditions of said system.

In witness whereof, I have hereunto set my hand this 2nd day of June, 1925.

CAMPBELL MACMILLAN.